US012654770B2

(12) United States Patent
Ueda et al.

(10) Patent No.: US 12,654,770 B2
(45) Date of Patent: Jun. 16, 2026

(54) STEERING OPERATION CONTROL APPARATUS, STEERING OPERATION CONTROL METHOD, AND STEERING SYSTEM

(71) Applicant: Hitachi Astemo, Ltd., Hitachinaka (JP)

(72) Inventors: Hiroko Ueda, Hitachinaka (JP); Kazuya Terashima, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 34 days.

(21) Appl. No.: 18/724,844

(22) PCT Filed: Feb. 24, 2023

(86) PCT No.: PCT/JP2023/006675
§ 371 (c)(1),
(2) Date: Jun. 27, 2024

(87) PCT Pub. No.: WO2023/167095
PCT Pub. Date: Sep. 7, 2023

(65) Prior Publication Data
US 2025/0065946 A1 Feb. 27, 2025

(30) Foreign Application Priority Data
Mar. 2, 2022 (JP) ................................. 2022-031522

(51) Int. Cl.
B62D 6/00 (2006.01)
B62D 5/00 (2006.01)

(52) U.S. Cl.
CPC ............. B62D 6/008 (2013.01); B62D 5/006 (2013.01)

(58) Field of Classification Search
CPC ......... B62D 6/008; B62D 5/006; B62D 5/001
See application file for complete search history.

(56) References Cited

U.S. PATENT DOCUMENTS

| | | | | |
|---|---|---|---|---|
| 2017/0210408 A1* | 7/2017 | Okazaki | .................. | B62D 1/06 |
| 2020/0047764 A1* | 2/2020 | Yamashita | ...... | B60W 30/18145 |

(Continued)

FOREIGN PATENT DOCUMENTS

| | | |
|---|---|---|
| JP | 2009-90686 | 4/2009 |
| JP | 2010-173592 | 8/2010 |

(Continued)

OTHER PUBLICATIONS

English translation of JP2017193301A.*

(Continued)

*Primary Examiner* — Joseph J Dallo
(74) *Attorney, Agent, or Firm* — Wenderoth, Lind & Ponack, L.L.P.

(57) ABSTRACT

A steering operation control apparatus includes a steering control unit configured to control a steering electric motor configured to operate a steering mechanism configured to drive a steering target wheel, and a reaction force control unit coupled with a steering wheel and configured to control a reaction force electric motor configured to provide a reaction force. The reaction force control unit has a position control function of outputting a stop position maintaining signal required for the reaction force electric motor. The position control function is configured to adjust a control amount of the stop position maintaining signal to provide to the reaction force electric motor based on a strength of a rotational torque applied to the steering wheel by a driver.

12 Claims, 9 Drawing Sheets

(56)  References Cited

U.S. PATENT DOCUMENTS

| | | | | |
|---|---|---|---|---|
| 2020/0130736 A1* | 4/2020 | Kodera | ................ | B62D 5/0463 |
| 2020/0130737 A1* | 4/2020 | Kodera | ................. | B62D 6/008 |
| 2020/0130738 A1* | 4/2020 | Kodera | ................. | B62D 6/008 |
| 2020/0198694 A1* | 6/2020 | Kawamura | .......... | B62D 5/0463 |
| 2020/0231204 A1* | 7/2020 | Isshiki | ................. | B62D 5/0463 |
| 2020/0269903 A1* | 8/2020 | Anraku | ................. | B62D 6/008 |
| 2022/0212715 A1* | 7/2022 | Kurokawa | ............. | B62D 1/187 |
| 2022/0227416 A1* | 7/2022 | Suzuki | ................ | B62D 15/025 |
| 2022/0227417 A1* | 7/2022 | Suzuki | .............. | B62D 15/0265 |
| 2022/0315105 A1* | 10/2022 | Kuragaki | ............ | B62D 15/025 |
| 2022/0355857 A1* | 11/2022 | Igarashi | .............. | B62D 15/021 |

FOREIGN PATENT DOCUMENTS

| | | | | | | |
|---|---|---|---|---|---|---|
| JP | 2017193301 | A | * | 10/2017 | | |
| WO | WO-2004087273 | A1 | * | 10/2004 | ........... | A63F 13/245 |
| WO | WO-2014192107 | A1 | * | 12/2014 | ........ | B62D 15/0285 |
| WO | WO-2020031294 | A1 | * | 2/2020 | ............ | B62D 6/008 |
| WO | WO-2020080435 | A1 | * | 4/2020 | ............ | B62D 1/187 |
| WO | WO-2021049110 | A1 | * | 3/2021 | .............. | B62D 5/04 |
| WO | 2021/181446 | | | 9/2021 | | |

OTHER PUBLICATIONS

International Search Report issued May 16, 2023 in International Application No. PCT/JP2023/006675, with English translation.
Written Opinion of the International Searching Authority issued May 16, 2023 in International Application No. PCT/JP2023/006675, with English translation.

* cited by examiner

STEERING OPERATION CONTROL APPARATUS, STEERING OPERATION CONTROL METHOD, AND STEERING SYSTEM

CROSS-REFERENCE TO RELATED APPLICATION

The present application claims priority under the Paris Convention to Japanese Patent Application No. 2022-031522 filed on Mar. 2, 2022. The entire disclosure of Japanese Patent Application No. 2022-031522 including the specification, the claims, the drawings, and the abstract is incorporated herein by reference in its entirety.

TECHNICAL FIELD

The present invention relates to a steering operation control apparatus configured to control a steering mechanism that steers a vehicle, and, in particular, to a steering operation control apparatus and a steering operation control method usable in a steering mechanism mechanically decoupled from a steering wheel.

BACKGROUND ART

For recent vehicles, there have been developed "steer-by-wire" steering operation control apparatuses in which a steering mechanism is mechanically decoupled from a steering wheel and is controlled using an electric motor for the purpose of, or example, controlling a steering gear ratio and controlling autonomous driving. According to this steer-by-wire technique, the electric motor provided to the steering mechanism independently of the steering wheel is rotated, and therefore a steering operation can be performed so as to allow the steering gear ratio to be adjusted according to the speed of the vehicle or allow the vehicle to be autonomously driven based on camera information, navigation information, and the like.

In such a steer-by-wire steering apparatus, the steering wheel and the steering mechanism are mechanically decoupled, and therefore no steering torque is applied from the steering mechanism to the steering wheel, which leads to evocation of an uncomfortable steering feeling from a driver's point of view. One solution for that is to mount a reaction force electric motor on the steering wheel and generate a reaction force torque based on the steering mechanism using this reaction force electric motor to provide it to the steering wheel, thereby easing the evocation of the uncomfortable steering feeling in the driver.

Then, when getting out of the vehicle after driving such a steer-by-wire vehicle or getting into the vehicle again, the driver may perform a disembarkation action or an embarkation action while grabbing the steering wheel in a case where the vehicle has a high seat position. At this time, the steering wheel can be freely rotated because it is disconnected from the steering mechanism. This poses such a risk that the driver grabbing the steering wheel may, for example, lose the disembarkation posture or the embarkation posture due to an unintended rotation of the steering wheel, thereby impairing the stability of the disembarkation action or the embarkation action or incurring injury depending on circumstances.

In light thereof, the rotation of the steering wheel can be prevented using, for example, a configuration indicated in Japanese Patent Application Publication No. 2010-173592 (hereinafter, "JP 2010-173592") to prevent such an unintended rotation of the steering wheel. In JP 2010-173592, an unintended rotation of a steering wheel can be prevented by providing a gear tooth on a steering shaft of the steering wheel and engaging an engagement pin with the gear tooth when an ignition is turned off.

CITATION LIST

Patent Literature

PTL 1: Japanese Patent Application Public Laid-Open No. 2010-173592

SUMMARY OF INVENTION

Technical Problem

The mechanical rotation prevention mechanism like the example disclosed in JP 2010-173592 can actually prevent an unintended rotation of the steering wheel, but there is a demand for a method of suppressing a rotation of the steering wheel with a simple configuration without using this type of mechanical rotation prevention mechanism if possible. For example, the rotation prevention mechanism like the example disclosed in JP 2010-173592 necessitates an addition mechanism, thereby raising a problem of an increase in the manufacturing cost depending on circumstances or a problem of an increase in the weight and thus an increase in energy cost (for example, fuel consumption).

An object of the present invention is to provide a novel steering operation control apparatus and steering operation control method capable of suppressing an unintended rotation of a steering wheel with a simple configuration.

Solution to Problem

One aspect of the present invention is a steering operation control apparatus usable for a steer-by-wire steering apparatus in which a steering wheel and a steering mechanism configured to drive a steering target wheel are disconnected without being coupled mechanically. The steering operation control apparatus includes a steering control portion configured to control a steering actuator configured to operate the steering mechanism, and a reaction force control portion coupled with the steering wheel and configured to control a reaction force actuator configured to provide a reaction force to the steering wheel. The reaction force control portion has a function of outputting a stop position maintaining signal required for the reaction force actuator to maintain a present position of the steering wheel to the reaction force actuator when a driver is detected to get out of or get into a vehicle.

According to the one aspect of the present invention, the steering operation control apparatus can avoid such a risk that the driver grabbing the steering wheel when getting out of or getting into the vehicle may lose his/her disembarkation posture or embarkation posture due to an unintended rotation of the steering wheel to impair the stability of the disembarkation action or the embarkation action or incur injury depending on circumstances. Further, this aspect just feeds the stop position maintaining signal for maintaining the present position of the steering wheel to the reaction force actuator, thereby being able to suppress an unintended rotation of the steering wheel with a simple configuration.

DESCRIPTION OF EMBODIMENTS

Embodiments of the present invention will be described in detail with reference to the drawings, but the present invention shall not be limited to the following embodiments and the scope thereof shall include even various modifications and application examples within the technical idea of the present invention.

The configuration of a steer-by-wire steering operation control apparatus to which the present invention is applied will be described below, before the embodiments will be specifically described.

In the steer-by-wire steering operation control apparatus, a steering shaft is disconnected from a steering rod. A rotational angle of the steering shaft, a disturbance torque, and the like are detected using a rotational angle sensor, an electric current sensor, and the like. An operation amount of a steering actuator is controlled based on these detection signals, and the steering rod is driven by that. Such a steer-by-wire steering operation control apparatus will be described first. The detailed configuration of the steering mechanism will be omitted herein.

Figure 1:
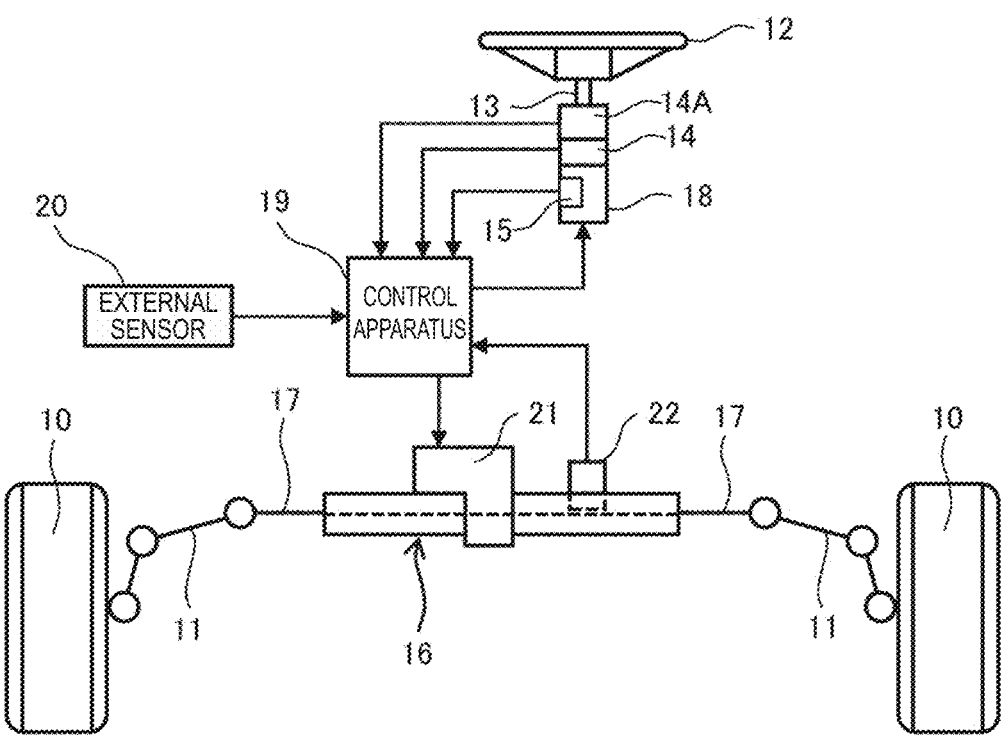
FIG. 1 is a configuration diagram illustrating an example of a steer-by-wire steering operation control apparatus to which the present invention is applied.

In FIG. 1, a steering target wheel (steered wheel) 10 is configured to be steered by a tie rod 11, and this tie rod 11 is coupled with a steering rod 17. Then, a steering wheel 12 is coupled with a steering shaft 13, and a steering operation angle (a steering angle) sensor or the like can be mounted on the steering shaft 13 as necessary.

The steering shaft 13 is not linked with the steering rod (may also be referred to as a rack bar) 17 of a steering mechanism 16, and a reaction force electric motor 18 as a reaction force actuator is mounted on the distal end of the steering shaft 13. In other words, the steering shaft 13 is configured to be mechanically decoupled from the steering mechanism 16, and the steering shaft 13 and the steering mechanism 16 are configured to be disconnected as a result thereof. The reaction force electric motor 18 is driven by a steering operation control apparatus 19.

A rotational angle sensor 14, which is formed by an encoder or the like, is mounted on the reaction force electric motor 18, and detects the rotational angle of the reaction force electric motor 18. The rotational angle sensor 14 can also be used as a steering operation angle (steering angle) sensor, but a steering operation angle sensor 14A is mounted on the steering shaft 13 in the present embodiment and the rotational angle (the steering angle) of the steering wheel 12 can be detected thereby.

Further, an electric current sensor 15 is mounted on the reaction force electric motor 18, and detects an electric current flowing in a coil forming the reaction force electric motor 18. This electric current is used to, for example, estimate the disturbance torque.

A steering electric motor mechanism 21 is provided to the steering mechanism 16 including the steering rod 17, and this steering electric motor mechanism 21 controls the steering operation of the steering rod 17. The steering electric motor is used as the steering actuator, but it is apparent that the steering actuator may be another type of electric actuator.

Then, the steering angle of the steering wheel 12 is detected by the steering operation angle sensor 14A. Further, the rotational angle of the reaction force electric actuator 18 is detected by the rotation angle sensor 14. Further, the electric current flowing in the coil of the reaction force electric motor 18 is detected by the electric current sensor 15. Then, these detection signals are input to the steering operation control apparatus 19. Besides them, various detection signals are input from an external sensor 20 to the steering operation control apparatus 19.

The steering operation control apparatus 19 calculates a control amount of the steering electric motor mechanism 21 based on the input steering angle signal, rotational angle signal, electric current signal, and the like, and further drives the steering electric motor mechanism 21. It is apparent that a parameter different from the steering angle signal, the rotational angle signal, and the electric current signal can also be used for the control amount of the steering electric motor mechanism 21, and, actually, many parameters are used.

A rotation of the steering electric motor mechanism 21 causes a rotation of an output-side pulley (not illustrated) of the steering mechanism 16 from an input-side pulley (not illustrated) via a belt (not illustrated), and further causes an axial stroke operation of the steering rod 16 via a steering nut (not illustrated), thereby causing the steering target wheel 10 to be steered. They are also known techniques and do not constitute the essence of the present invention, and therefore the detailed descriptions thereof will be omitted herein.

Further, the steering operation control apparatus 19 calculates a control amount of the reaction force electric motor 18 based on the input steering angle signal, rotational angle signal, electric current signal, and the like, and further drives the reaction force electric motor 18. A parameter different from the steering angle signal, the rotational angle signal, and the electric current signal can also be used for the control amount of the reaction force electric motor 18.

A rack position sensor 22 is provided to the steering mechanism 16, and this rack position sensor 22 detects an actual steering amount (steering angle) of the steering target wheel 10 and outputs a steering amount signal. The rack position sensor 22 detects an axial movement amount of the steering rod 17. The rack position sensor 22, which detects the stroke amount of the steering rod 17, is indicated as the steering amount sensor, but the steering amount sensor may be a rotational angle sensor provided to the steering electric motor that applies a steering force to the steering rod 17 besides that, and sensors different therefrom that can detect the position (the steering amount) of the steering rod 17 also fall within the range of the steering amount sensor.

Figure 2:
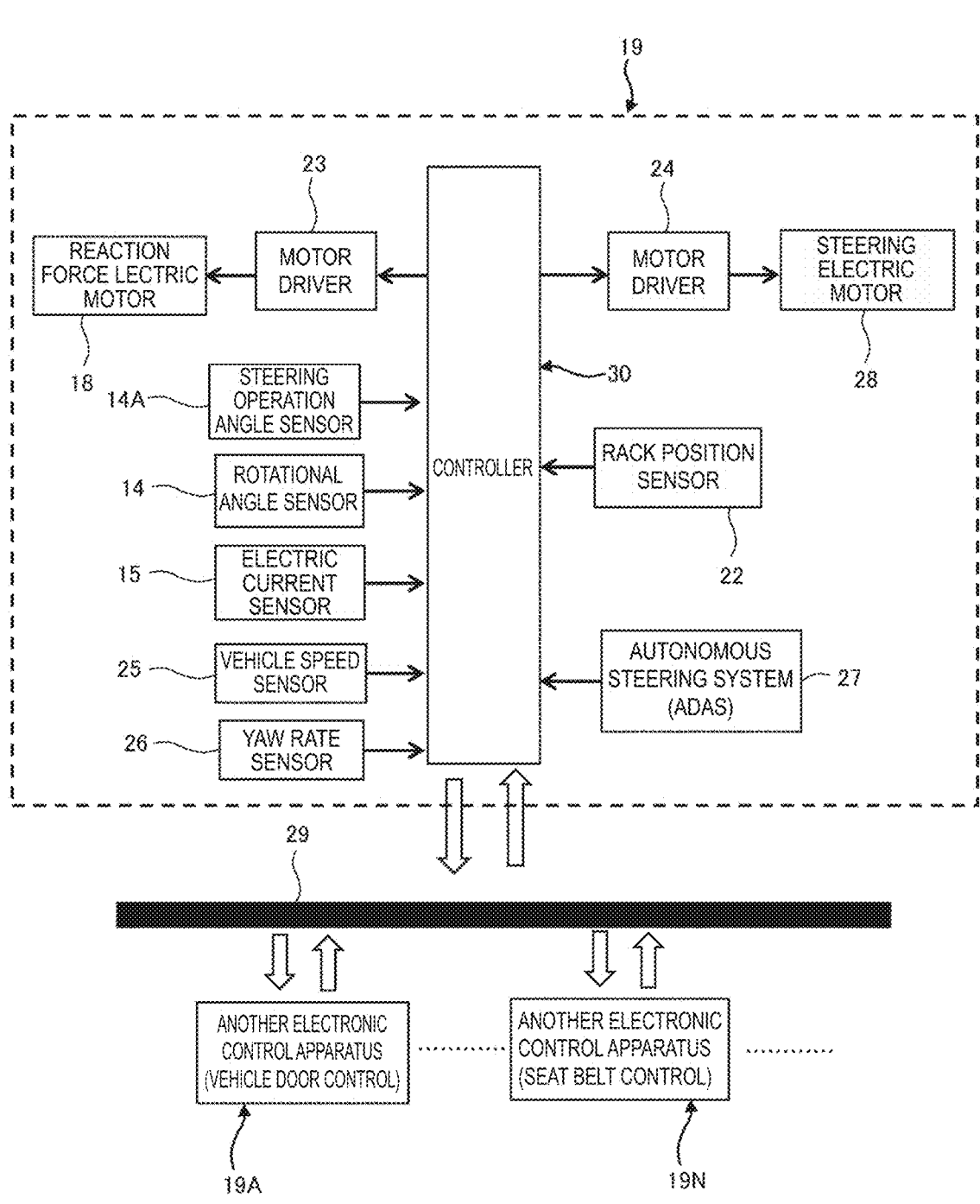
FIG. 2 is a configuration diagram illustrating the configuration of an in-vehicle network system in which the steering operation control apparatus illustrated in FIG. 1 is connected to a CAN bus.

Next, FIG. 2 illustrates the schematic configuration of the steering operation control apparatus 19, which controls the reaction force electric motor 18 and a steering electric motor 28. This steering operation control apparatus 19 is equipped with both a function of a reaction force actuator controller unit (corresponding to a reaction force control portion in the claims) and a function of a steering actuator controller (corresponding to a steering control portion in the claims) as a controller 30, and is configured as a single control node 19.

The controller 30 includes the reaction force actuator controller unit and the steering actuator controller unit, as will be described below. The basic functions and operations of these controller units are known, and therefore the detailed descriptions thereof will be omitted herein.

The reaction force actuator controller unit mounted on the controller 30 includes a microcomputer (MCU) and a CAN transceiver, and the microcomputer includes a transmission port and a reception port and is connected to the CAN transceiver. The CAN transceiver has a function of carrying out CAN communication by connecting the transmission port and a "High" side of a CAN bus 29 and connecting the reception port and a "Low" side of the CAN bus 29.

The microcomputer includes a central processing unit (CPU), a nonvolatile memory, and a CAN controller therein. The central processing unit controls the reaction force electric motor 18, and further controls communication with the CAN bus 29 in cooperation with the CAN controller.

Further, the steering actuator controller unit includes a microcomputer (MCU) and a CAN transceiver, and the microcomputer includes a transmission port and a reception port and is connected to the CAN transceiver. The CAN transceiver has a function of carrying out CAN communication by connecting the transmission port and a "High" side of the CAN bus 29 and connecting the reception port and a "Low" side of the CAN bus 29.

The microcomputer includes a central processing unit (CPU), a nonvolatile memory, and a CAN controller therein. The central processing unit controls the steering electric motor 28, and further controls communication with the CAN bus 29 in cooperation with the CAN controller.

The reaction force actuator controller unit and the steering actuator controller unit can also be integrated. In this case, the respective functions are supposed to be fulfilled by a single microcomputer.

The steering operation control apparatus 19 is connected to the CAN bus 29, and is connected by the above-described CAN controller to other control nodes 19A to 19N, such as a vehicle door control apparatus 19A, which controls a vehicle door, a seat belt control apparatus 19N, which controls, for example, how much the seat belt is stretched, and a brake control apparatus, which controls the brake, via the CAN bus 29, and mutually inputs and outputs control information and the like. Control signals from these other control nodes are used as disembarkation information when the driver gets out of the vehicle, as will be described below.

The rotational angle sensor 14 and the electric current sensor 15 are mounted on the reaction force electric motor 18 connected to the steering shaft 13, and the reaction force electric motor 18 is mechanically connected to the steering wheel 12 via the steering shaft 13. The rotational angle sensor 14 is a sensor that detects the rotational angle of the reaction force electric motor 18, and the electric current sensor 15 is a sensor that detects the electric current flowing in the coil of the reaction force electric motor 18. The steering operation angle sensor 14A is a sensor that detects the steering angle, which is the rotational angle of the steering wheel 12.

The reaction force electric motor 18 is an electric motor that applies a steering reaction force to the steering shaft 13 via a motor driver 23 controlled by the steering operation control apparatus 19, and monitors inputs of the steering angle signal, the rotational angle signal, the electric current signal, and the like, and applies a determined steering reaction force to the steering shaft 13.

Further, the steering operation control apparatus 19 feeds a driving signal according to the detection signals such as the steering angle signal, the rotational angle signal, and the electric current signal to the steering electric motor 28 mechanically connected to the steering rod 17 via a motor driver 24.

The steering operation angle signal, the rotational angle signal, and the electric current signal are fed from the steering operation rotational angle sensor 14A, the rotational angle sensor 14, and the electric current sensor 15 to the steering operation control apparatus 19, respectively. Further, a detection signal of a vehicle running state influential on the steering is fed from a running state sensor such as a vehicle speed sensor 25 and a yaw rate sensor 26 to the steering operation control apparatus 19. Further, a detection signal indicating the movement position of the steering rod 17 is fed from the rack position sensor 22 (refer to FIG. 1) mounted at an intermediate portion of a housing covering the steering rod 17 to the steering operation control apparatus 19.

Now, the rack position sensor 22 is a sensor that detects the position of the steering rod 17, but the value detected by the rack position sensor 22 allows the steering angle of the steering target wheel 10 to be detected because the steering rod 17 is directly connected to the tie rod 11. In this manner, the rack position sensor 22 functions as a steering angle detector of the steering target wheel 10.

Further, an external steering instruction value is fed from an autonomous steering system (an ADAS system) 27 to the steering operation control apparatus 19. The external steering instruction value is an instruction value calculated by the autonomous steering system 27, and is issued to steer the steering target wheel 10 by the steering mechanism 16 when the vehicle departs from inside a white line on a road or avoids an obstacle with the aid of lane keeping control.

The steering operation control apparatus 19 introduces, for example, the detection signals indicating the steering angle, the rotational angle, the electric current, the rack position, and the running state amount, and the external steering instruction value fed from the steering operation angle sensor 14A, the rotational angle sensor 14, the electric current sensor 15, the rack position sensor 22, the running state sensors 25 and 26, and the autonomous steering system 27 per predetermined sampling cycle, respectively, determines a steering amount that should be applied to the steering rod 17 by combining the introduced detection signals and external steering instruction value as appropriate, calculates a coil electric current that should be supplied to the steering electric motor 35 to acquire this steering amount, and feeds a control signal according to a result of this calculation to the motor driver 24.

Similarly, the steering operation control apparatus 19 determines a steering reaction force that should be applied to the steering wheel 12 by combining, for example, the detection signals indicating the rotational angle, the electric current, the rack position, and the running state amount, and the external steering instruction value as appropriate, calculates a coil electric current that should be supplied to the reaction force electric motor 18 to acquire this steering reaction force, and feeds a control signal according to a result of this calculation to the motor driver 23.

When getting out of the vehicle after driving such a steer-by-wire vehicle or getting into the vehicle again, the driver may perform a disembarkation action or an embarkation action while grabbing the steering wheel. At this time, because the steering wheel 12 is disconnected from the steering mechanism, the driver grabbing the steering wheel may be exposed to a risk such as losing his/her disembarkation posture or embarkation posture due to an unintended rotation of the steering wheel 12 to impair the stability of the disembarkation action or the embarkation action or incur injury depending on circumstances.

With the aim of avoiding such inconvenience, the present embodiment proposes a steering operation control apparatus configured in the following manner.

The present embodiment is characterized in the following manner. The steering operation control apparatus 19 is usable for the steer-by-wire steering apparatus in which the steering wheel 12 and the steering mechanism configured to drive the steering target wheel 10 are disconnected without being coupled mechanically. The steering operation control apparatus 19 includes the steering control portion configured to control the steering actuator 28 configured to operate the steering mechanism 16, and the reaction force control portion configured to control the reaction force actuator 18 coupled with the steering wheel 12 and configured to provide the reaction force to the steering wheel 12. The reaction force control portion has a function of outputting a stop position maintaining signal required for the reaction force actuator to maintain the present position of the steering wheel to the reaction force actuator when the driver is detected to get out of or get into the vehicle.

According to this configuration, the present embodiment just feeds the stop position maintaining signal for maintaining the present position of the steering wheel 12 to the reaction force actuator, thereby being able to bring about an advantageous effect of being able to suppress an unintended rotation of the steering wheel 12 with a simple configuration.

Figure 3:
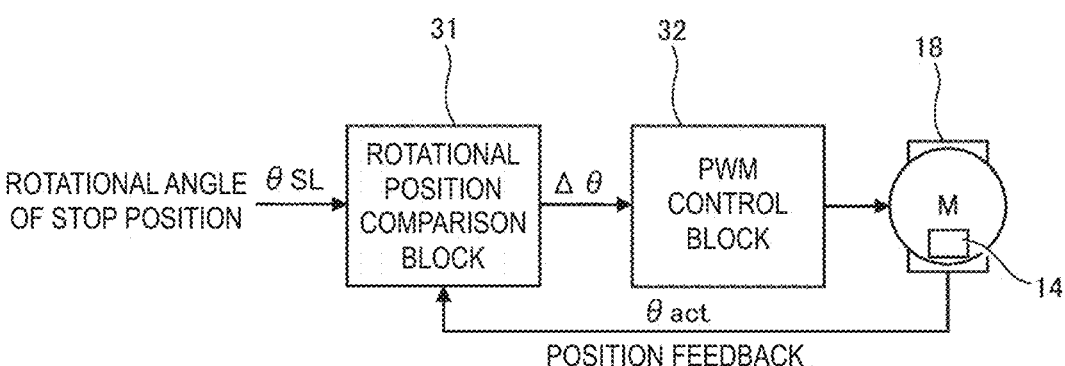
FIG. 3 illustrates how servo-lock control, which is a position control function, operates.

Now, the function of maintaining the present position of the steering wheel 12 by the reaction force actuator according to the present embodiment can be realized by a position control function (servo-lock control). In the following description, the servo-lock control will be described briefly. FIG. 3 illustrates functional blocks to facilitate a better understanding of the servo-lock control.

The servo-lock control includes systems of a rotational position comparison block 31, a PWM control block 32, and the reaction force electric motor 18. A stop rotational angle (θSL) of the reaction force electric motor 18 is input to the rotational position comparison block 31 as the present stop position. When the steering wheel 12 and thus the reaction force electric motor 18 are rotated from this state due to the driver's disembarkation action, this rotation is detected by the rotational sensor (the encoder) 14. A detected displacement rotational angle (θact) is input to the rotational position comparison block 31 and is compared.

A rotational angle deviation (Δθ) determined by this comparison is input to the next PWM control block 32. The PWM control block 32 generates a control signal workable to cancel out this rotational angle deviation (Δθ) by proportional-integral control that is position feedback control, and the generated control signal is input to the reaction force electric motor 8. This control signal workable to cancel out the rotational angle deviation (Δθ) corresponds to the above-described "stop position maintaining signal".

The reaction force electric motor 18 generates a stop torque for suppressing the rotation of the steering wheel 12 based on that, and feeds it to the steering wheel 12. The reaction force electric motor 18 can maintain the present stop position by repeating such an operation. This allows an unintended rotation of the steering wheel 12 to be suppressed as a result.

Figure 4:
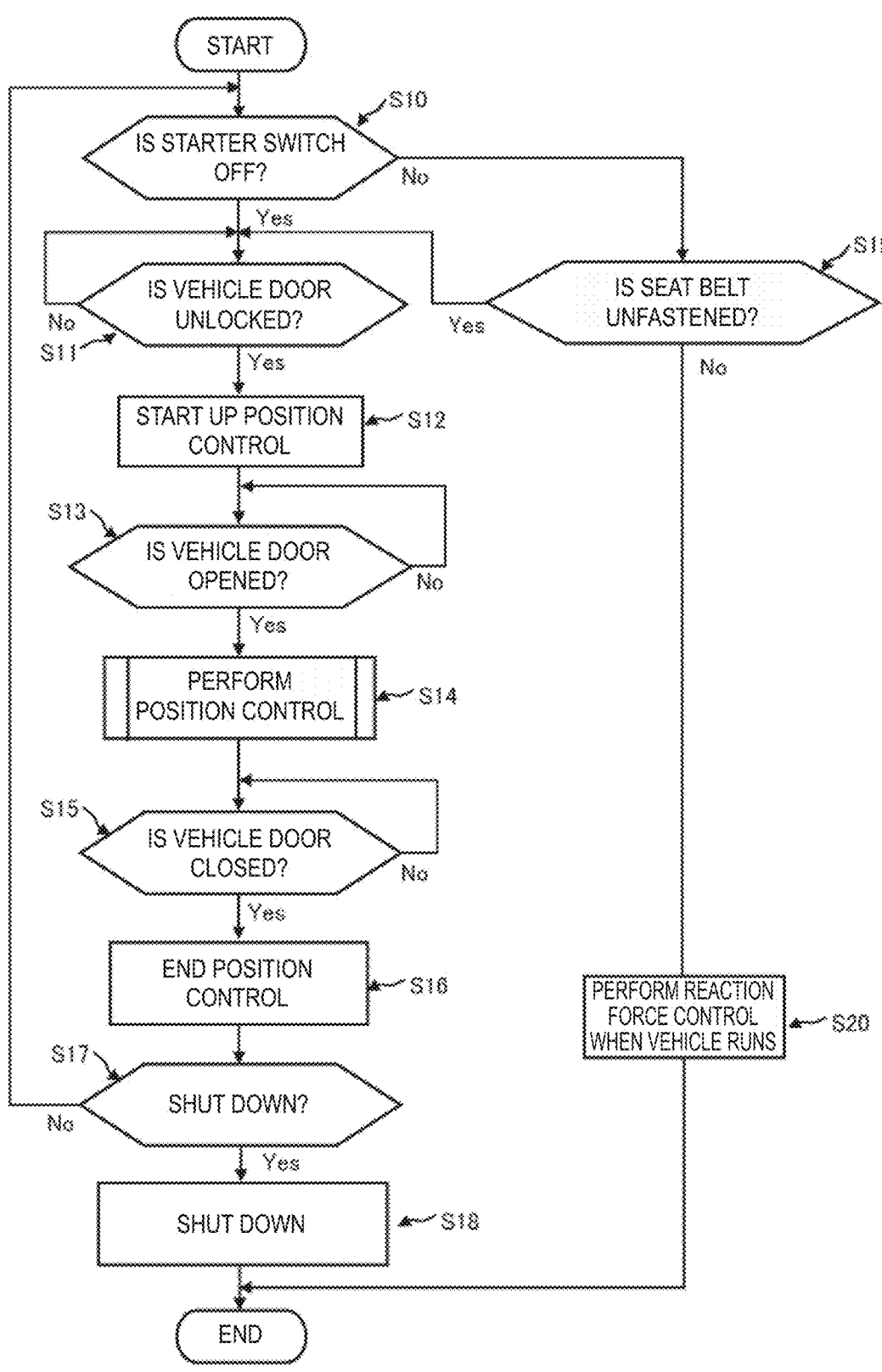
FIG. 4 is a flowchart illustrating a processing flow of a reaction force electric motor when a driver gets out of a vehicle according to an embodiment of the present invention.

Next, a specific processing flow when the driver gets out of the vehicle will be described. FIG. 4 illustrates a processing flow executed by the reaction force actuator control unit, and the illustrated processing flow is started up at a predetermined startup timing (for example, per predetermined time) and is executed when the startup timing has come.

<<Step S10>>

In step S10, the reaction force actuator control unit determines whether a starter switch is presently turned off. The starter switch is a switch used when the vehicle is driven. At this time, the reaction force actuator control unit determines whether at least the reaction force actuator control unit is in a powered-on state based on the starter switch.

If the starter switch is determined to be "OFF", the processing proceeds to step S11. However, in this state, a power source relay of the reaction force actuator control unit is still connected to the power source, and therefore the reaction force actuator control unit can execute the following control steps.

Then, if the starter switch is determined to be "OFF" in this determination, the driver is estimated to have an intention of getting out of the vehicle. On the other hand, if the starter switch is determined not to be "OFF" (=corresponding to ON), the processing proceeds to step S19. If the starter switch is determined not to be "OFF" at this time, it is estimated that there is a possibility that the driver may continue driving the vehicle or temporarily stop or park the vehicle and get out of the vehicle.

<<Step S11>>

In step S11, the reaction force actuator control unit determines whether the vehicle door on the driver's side is unlocked assuming that the driver has an intention of getting out of the vehicle since the starter switch is turned "OFF" in step S10. If the door on the driver's side is not unlocked, the processing continuously returns to step S11 again. On the other hand, if the door on the driver's side is determined to be unlocked, the processing proceeds to step S12. At this time, unlock information of the door on the driver's side can be acquired from the vehicle door control apparatus 19A via the CAN bus 29 as illustrated in FIG. 2.

<<Step S12>>

If the door on the driver's side is unlocked, the reaction force actuator control unit starts up the "position control function" directed to the steering wheel 12. This "position control function" is the "servo-lock control" for maintaining the rotational position of the reaction force electric motor 18 as described above. In this state, the vehicle door on the driver's side is still in an unopened state. After the "position control function" is started up, the processing proceeds to step S13.

<<Step S13>>

In step S13, the reaction force actuator control unit determines whether the vehicle door on the driver's side is opened. If the door on the driver's side is not opened, the processing continuously returns to step S13 again. On the other hand, if the door on the driver's side is determined to be opened, the processing proceeds to step S14. At this time, open information of the door on the driver's side can also be acquired from the vehicle door control apparatus 19A via the CAN bus 29 as illustrated in FIG. 2.

Then, the fact that the vehicle door is opened is used as information for detecting that the driver gets out of the vehicle (the disembarkation information). Various kinds of information can be used as the disembarkation information besides that, and, for example, the disembarkation information can be acquired by mounting a seat occupancy sensor on the driver's seat and referring to the driver's seat occupancy information.

Alternatively, the disembarkation information can be acquired based on a rotation of the steering wheel 12 or the driver's behavior using an in-vehicle camera. Further alternatively, the disembarkation information can be acquired based on information indicating whether the driver holds the steering wheel 12 using an electrostatic sensor mounted on the steering wheel 12. These kinds of disembarkation information can be either used alone or used in combination.

<<Step S14>>

In step S14, the reaction force actuator control unit exerts the "position control function" (the servo-lock function), assuming that the driver gets out of the vehicle while grabbing the steering wheel because the vehicle door on the driver's side is opened. The "position control function" operates as described with reference to FIG. 3.

When exerting this "position control function", the reaction force actuator control unit introduces and stores the position of the stop rotational angle ($\theta$SL) of the reaction force electric motor 18 at this moment. This stop rotational angle ($\theta$SL) corresponds to the stop position of the steering wheel 12 that should be maintained. Then, if the steering wheel 12 is about to be operated by the driver when the driver gets out of the vehicle, the rotational sensor 14 mounted on the reaction force electric motor 18 detects this displacement rotational angle ($\theta$act).

Then, the rotational angle deviation ($\Delta\theta$) is detected between the detected displacement rotational angle ($\theta$act) and the stored stop rotational angle ($\theta$SL) of the reaction force electric motor 18, and the reaction force electric motor 18 is driven so as to cancel out this rotational angle deviation ($\Delta\theta$) to generate the stop torque. This allows an unintended rotation of the steering wheel to be avoided.

Figure 5:
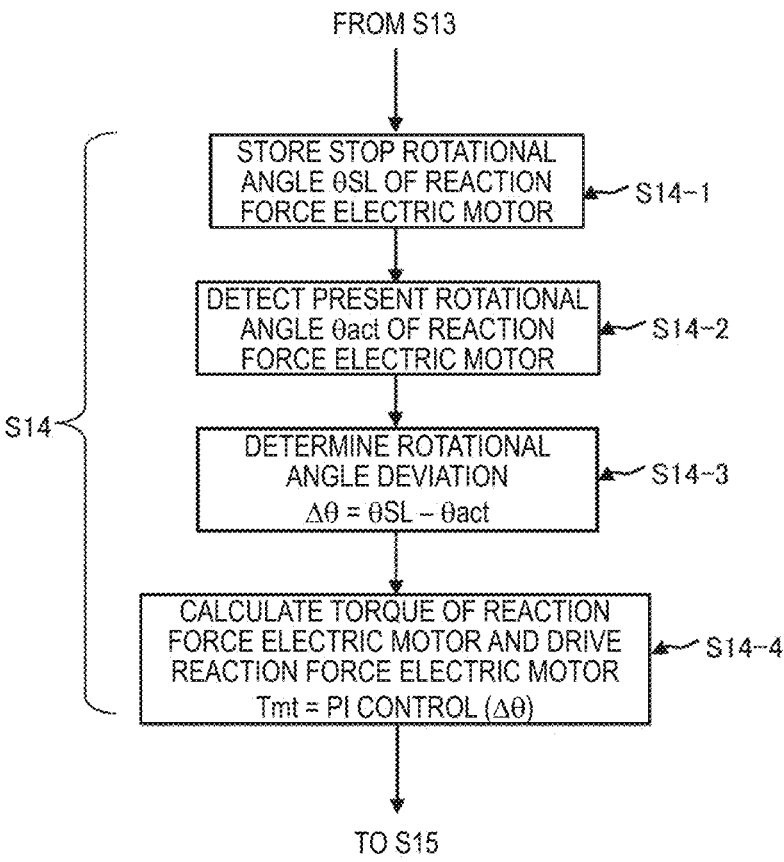
FIG. 5 is a flowchart illustrating the details of step S14 illustrated in FIG. 4.

The servo-lock control is performed using the rotational angle of the reaction force electric motor 18 in step S14, but instead may be performed using the rotational angle (the steering angle) of the steering wheel 12. In this case, the servo-lock control can be performed using an angle signal of the steering operation angle sensor. Now, FIG. 5 illustrates a specific processing flow of step S14, and therefore will be described additionally.

<<Step S14-1>>

In step S14-1, the reaction force actuator control unit detects and stores the stop rotational angle ($\theta$SL) of the reaction force electric motor 18. This detected rotational angle corresponds to a stop position serving as a reference position of the steering wheel 12. After the stop rotational angle ($\theta$SL) is stored, the processing proceeds to step S14-2.

<<Step S14-2>>

In step S14-2, the reaction force actuator control unit detects the present rotational angle ($\theta$act) of the reaction force electric motor 18. This detected rotational angle ($\theta$act) corresponds to the displacement rotational angle ($\theta$act) of the steering wheel 12 rotated by being grabbed by the driver. Therefore, as the steering wheel 12 is more largely rotated by being grabbed by the driver, the value of the displacement rotational angle ($\theta$act) increases. After the displacement rotational angle ($\theta$act) is detected, the processing proceeds to step S14-3.

<<Step S14-3>>

In step S14-3, the reaction force actuator control unit determines how much the steering wheel is rotated based on the stop rotational angle ($\theta$SL) determined in step S14-1 and the displacement rotational angle ($\theta$act) detected in step S14-2. In other words, the reaction force actuator control unit calculates "$\Delta\theta=\theta$SL$-\theta$act", thereby determining the rotational angle deviation ($\Delta\theta$) of the steering wheel. This rotational angle deviation ($\Delta\theta$) serves as a deviation used in the position feedback control. After the rotational angle deviation ($\Delta\theta$) is determined, the processing proceeds to step S14-4.

<<Step S14-4>>

In step S14-4, based on the rotational angle deviation ($\Delta\theta$) determined in step S14-3, the reaction force actuator control unit calculates a control amount (Tmt) for canceling out this rotational angle deviation ($\Delta\theta$) by the proportional-integral control that is position feedback control, and drives the reaction force electric motor 18. Then, the stop torque is generated on the reaction force electric motor 18 according to the control amount (Tmt), and the rotation of the steering wheel is suppressed. This "position control function" is continuously exerted, and then the processing proceeds to step S15.

The control amount fed to the reaction force electric motor 18 can also be adjusted based on the strength of a grab force applied to the steering wheel 12 (a torque with which the steering wheel is rotated by the driver).

<<Step S15>>

Referring back to FIG. 4, in step S15, the reaction force actuator control unit determines whether the vehicle door on the driver's side is closed. If the vehicle door on the driver's side is closed, the driver is estimated to be outside the vehicle with his/her hand released from the steering wheel already. Therefore, in this case, the processing proceeds to step S16.

On the other hand, if the vehicle door on the driver's side is not closed, the driver is estimated not to release his/her hand from the steering wheel yet. Therefore, the processing continuously returns to step S15 again.

Now, the information indicating that the vehicle door on the driver's side is closed is used as information for detecting that the driver has gotten out of the vehicle (disembarkation completion information). Various kinds of information can be used as the disembarkation completion information besides that, and, for example, the disembarkation completion information can be acquired based on the driver's behavior using the in-vehicle camera. Further alternatively, the disembarkation completion information can be acquired based on the information indicating whether the driver holds the steering wheel 12 using the electrostatic sensor mounted on the steering wheel 12. These kinds of disembarkation completion information can be either used alone or used in combination.

<<Step S16>>

Since the vehicle door on the driver's side is determined to be closed in step S15, in step S16, the execution of the "position control function" is ended. In this case, the execution of the "position control function" can be ended by stopping driving the reaction force electric motor 18. After this step is completed, the processing proceeds to step S17.

<<Step S17>>

In step S17, the reaction force actuator control unit determines whether to shut down itself because performing the above-described processing flow under such a condition that the starter switch is turned "OFF" and the power source relay is connected. This determination can be made based on an AND condition between the completion of the execution of the "position control function" and "OFF" of the starter switch.

If the reaction force actuator control unit determines to shut down itself, the processing proceeds to step S18. If the reaction force actuator control unit determines not to shut down itself, the processing returns to step S10 again and the same processing step is performed. The reaction force actuator control unit determines not to shut down itself when the starter switch is in the "ON" state. This processing is configured in this manner in consideration of the fact that there is a possibility that the driver may temporarily stop or park the vehicle and get out of the vehicle in this case.

<<Step S18>>

Since determining to shut down the reaction force actuator control unit in step S17, in step S18, the reaction force actuator control unit shuts down itself by setting the power source relay provided between the steering operation control apparatus 19 and the power source battery to "OFF". After the shutdown is completed, the processing proceeds to END, thereby being ended.

<<Step S19>>

Next, referring back to step S10, if the starter switch is determined not to be "OFF" (=corresponding to "ON"), the processing proceeds to step S19. If the starter switch is determined to be "ON" in step S10, it is estimated that there is a possibility that the driver may continue driving the vehicle or temporarily stop or park the vehicle and get out of the vehicle for some business.

Therefore, in step S19, the reaction force actuator control unit determines whether the seat belt is unfastened. Now, seat belt fastening information can be acquired from the seat belt control apparatus 19N via the CAN bus 29 as illustrated in FIG. 2. Alternatively, the above-described determination can also be made by acquiring handbrake state information aside from the seat belt fastening information.

The driver is estimated to continue driving the vehicle without getting out of the vehicle if the seat belt is not unfastened, while estimated to temporarily stop the vehicle and get out of the vehicle for some business if the seat belt is unfastened. Then, if the seat belt is not unfastened, the processing proceeds to step S20. If the seat belt is unfastened, the processing proceeds to step S11.

In the case of the handbrake, the driver is estimated to continue driving the vehicle without getting out of the vehicle if the handbrake is not operated while estimated to temporarily get out of the vehicle if the handbrake is operated. Then, if the handbrake is not operated, the processing proceeds to step S20. If the handbrake is operated, the processing proceeds to step S11.

In this manner, the seat belt fastening information and the handbrake operation information can be deemed to be information indicating that the driver temporarily stops the vehicle to get out of the vehicle.

<<Step S20>>

In step S20, the driver is determined to have an intention of continuing driving the vehicle, and reaction force control when the vehicle runs is performed. This reaction force control is common control and is not closely related to the present invention, and therefore the detailed description thereof will be omitted herein.

On the other hand, if the seat belt is unfastened in step S19, the processing proceeds to step S11, and the processing steps as steps S12 to S17 are performed. Therefore, the rotation of the steering wheel is also suppressed due to the "position control function" when the driver temporarily stops or parks the vehicle and gets out of the vehicle.

Now, the reaction force actuator control unit determines whether to shut down itself in step S17, but the starter switch is "ON" in step S10, which causes the processing to return to step S10 without the reaction force actuator control unit shut down and the same processing steps to be repeated.

In this manner, in the present embodiment, the steering operation control apparatus 19 includes the steering control portion 30 configured to control the steering actuator 28 configured to operate the steering mechanism 16 configured to drive the steering target wheel 10, and the reaction force control portion 30 configured to control the reaction force actuator 18 coupled with the steering wheel 12 and configured to provide the reaction force to the steering wheel 12. The reaction force control portion 30 has the function of outputting the stop position maintaining signal required for the reaction force actuator 18 to maintain the present position of the steering wheel 12 to the reaction force actuator 18 when the driver is detected to get out of the vehicle.

As a result, the present embodiment can avoid such a risk that the driver grabbing the steering wheel when getting out of the vehicle may lose his/her disembarkation posture due to an unintended rotation of the steering wheel 12 to impair the stability of the disembarkation action or incur injury depending on circumstances. Further, the present embodiment just feeds the stop position maintaining signal for maintaining the present position of the steering wheel to the reaction force actuator, thereby being able to suppress an unintended rotation of the steering wheel with a simple configuration.

Figure 6:
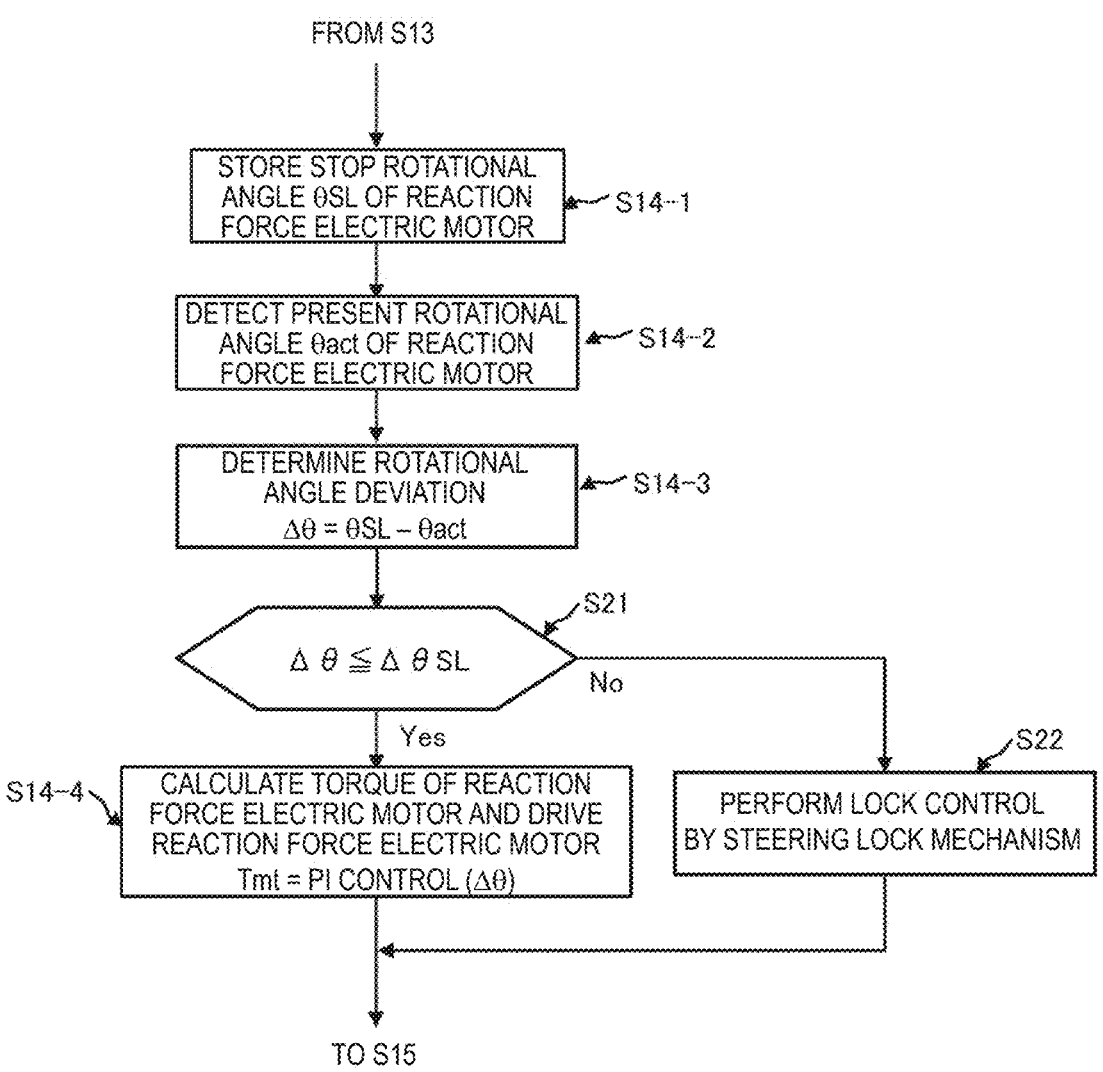
FIG. 6 is a flowchart illustrating the details of a first modification of step S14 illustrated in FIG. 4.

Next, a first modification of the above-described position control function will be described. The first modification is an example in which a precaution is implemented in preparation for possible application of a force stronger than a maximum generated torque of the reaction force electric motor 18 to the steering wheel 12. This is an example designed in consideration of, for example, possible application of a strong torque to the steering wheel 12 when a strongly built driver or a heavy driver grabs the steering wheel 12. FIG. 6 illustrates the details of the position control performed in step S14 in FIG. 4. Step S14-1 to step S14-4 are control steps similar to the control steps illustrated in FIG. 5.

<<Step S14-1>>

In step S14-1, the reaction force actuator control unit detects and stores the stop rotational angle ($\theta$SL) of the reaction force electric motor 18. This detected rotational angle corresponds to the stop position serving as the reference position of the steering wheel 12. After the stop rotational angle ($\theta$SL) is stored, the processing proceeds to step S14-2.

<<Step S14-2>>

In step S14-2, the reaction force actuator control unit detects the present rotational angle ($\theta$act) of the reaction force electric motor 18. This detected rotational angle ($\theta$act) corresponds to the displacement rotational angle ($\theta$act) of the steering wheel 12 rotated by being grabbed by the driver. Therefore, as the steering wheel 12 is more largely rotated by being grabbed by the driver, the value of the displacement rotational angle ($\theta$act) increases. After the displacement rotational angle ($\theta$act) is detected, the processing proceeds to step S14-3.

<<Step S14-3>>

In step S14-3, the reaction force actuator control unit determines how much the steering wheel is rotated based on the stop rotational angle (θSL) determined in step S14-1 and the displacement rotational angle (θact) detected in step S14-2. In other words, the reaction force actuator control unit calculates "Δθ=θSL–θact", thereby determining the rotational angle deviation (Δθ) of the steering wheel. This rotational angle deviation (Δθ) serves as the deviation used in the position feedback control. After the rotational angle deviation (Δθ) is determined, the processing proceeds to step S21.

<<Step S21>>

In step S21, the reaction force actuator control unit determines whether the rotational angle deviation (Δθ) determined in step S14-3 is equal to or smaller than a predetermined deviation threshold value (ΔθSL). This means that, even when the reaction force electric motor 18 provides the stop torque for stopping the steering wheel 12 due to the execution of the previous processing flow, the reaction force electric motor 18 can no longer block the rotation of the steering wheel 18 when the present rotational angle deviation (Δθ) exceeds the deviation threshold value (ΔθSL).

Therefore, if the present rotational angle deviation (Δθ) is determined to be equal to or smaller than the deviation threshold value (ΔθSL), the processing proceeds to step S14-4. If the present rotational angle deviation (Δθ) exceeds the deviation threshold value (ΔθSL), the processing proceeds to step S22.

<<Step S14-4>>

In step S14-4, based on the rotational angle deviation (Δθ) determined in step S14-3, the reaction force actuator control unit calculates the control amount (Tmt) for canceling out this rotational angle deviation (Δθ) by the proportional-integral control that is position feedback control, and drives the reaction force electric motor 18. Then, the stop torque is generated on the reaction force electric motor 18 according to the control amount (Tmt), and the rotation of the steering wheel is suppressed. This "position control function" is continuously exerted, and then the processing proceeds to step S15.

<<Step S22>>

The reaction force electric motor 18 is determined to be insufficient to block the rotation of the steering wheel 18 in the determination in step S21. Therefore, in step S22, the rotation of the steering wheel 12 is forcibly blocked by a steering lock mechanism.

After this steering lock mechanism is operated, the processing proceeds to step S15.

Figure 7:
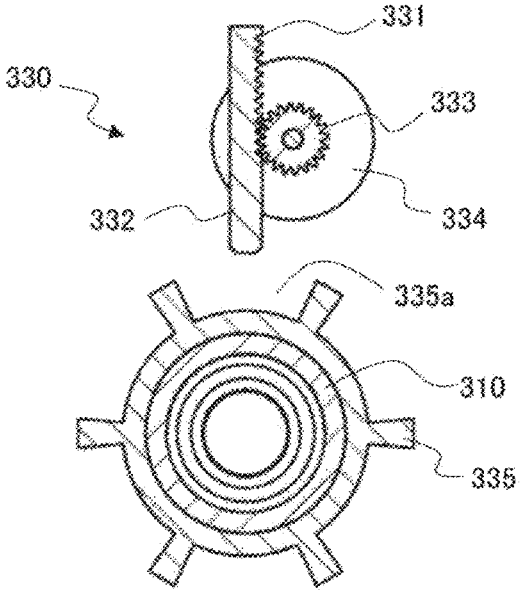
FIG. 7 is a configuration diagram illustrating the configuration of a steering lock mechanism (in an unlocking state) in step S22 illustrated in FIG. 6.
Figure 8:
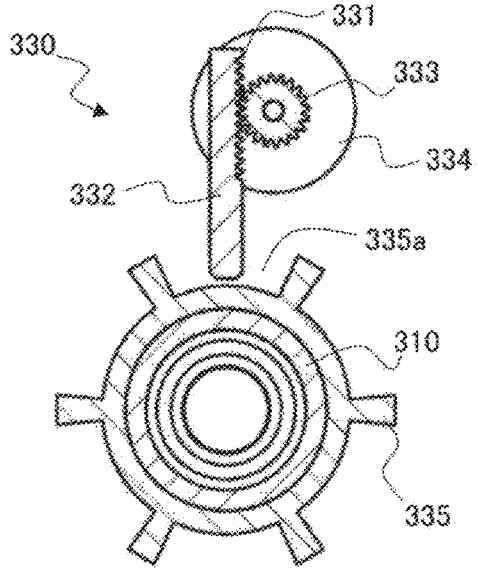
FIG. 8 is a configuration diagram illustrating the configuration of the steering lock mechanism (in a locking state) in step S22 illustrated in FIG. 6.

FIGS. 7 and 8 illustrate the configuration of the steering lock mechanism. For example, a pin engagement-type or brake-type lock mechanism can be employed as a steering lock mechanism 330.

FIGS. 7 and 8 illustrate the configuration of the steering lock mechanism 330 configured as the pin engagement-type mechanism, and illustrate the steering lock mechanism 330 in an unlocking state and in a locking state, respectively. Then, the steering lock mechanism 330 is brought into the unlocking state if step S14-4 is performed, or brought into the locking state if step S22 is performed.

The steering lock mechanism 330 illustrated in FIGS. 7 and 8 includes a movable pin 332, on which a rack gear 331 is formed, a pinion gear 333, which is meshed with the rack gear 331, a motor 334, which rotates and drives the pinion gear 333, and a stopper gear 335, which is provided on the outer periphery of a steering shaft 310.

The rack gear 331 and the pinion gear 333 convert a rotational force of an output shaft of the motor 334 into a linear motion of the movable pin 332, and the movable pin 332 is supported movably in an axial direction assuming that the axial direction refers to a radial direction around the steering shaft 310. Then, in step S14-4, the movable pin 332 is placed in the unlocking state where it does not restrict a rotation of the steering shaft 310 when the movable pin 332 is located at a retracted position where it is not engaged with the stopper gear 335 as illustrated in FIG. 7.

Then, in step S22, the motor 334 is rotated and driven from the unlocking state in a direction for moving the movable pin 332 toward the steering shaft 310. When the distal end of the movable pin 332 enters an insertion groove 335a formed by a tooth of the stopper gear 335 as illustrated in FIG. 8, the side surface of the distal end portion of the movable pin 332 and the tooth of the stopper gear 335 are brought into abutment with each other against the rotation of the steering shaft 310, thereby establishing the locking state of restricting the rotation of the steering shaft 310.

In this manner, according to the present modification, even when a force stronger than the maximum generated torque of the reaction force electric motor 18 is applied to the steering wheel 12, the rotation of the steering wheel 12 can be reliably prevented.

Next, a second modification of the above-described position control function will be described. This second modification is an example in which a safety precaution is implemented in preparation for possible application of a force stronger than the maximum generated torque of the reaction force electric motor 18 to the steering wheel 12.

For example, when the driver's gripping force diminishes or disappears after the steering wheel 12 is largely rotated by being gripped by the driver, the steering wheel 12 is expected to return to the stop position rapidly. This raises the necessity of a safety precaution for protecting the driver.

Figure 9:
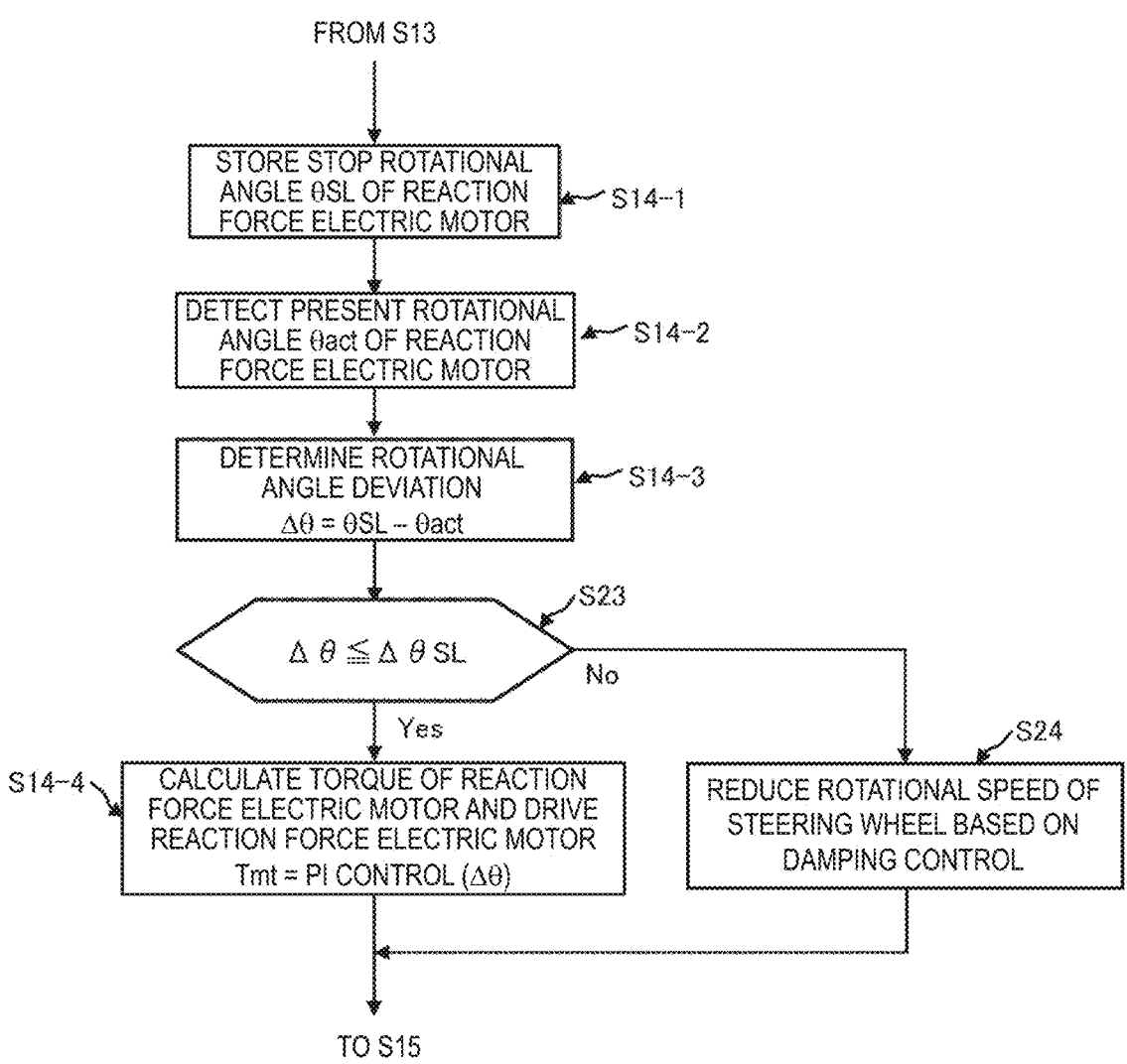
FIG. 9 is a flowchart illustrating the details of a second modification of step S14 illustrated in FIG. 5.

FIG. 9 illustrates the details of the position control performed in step S14 in FIG. 4. Step S14-1 to step S14-4 are control steps similar to the control steps illustrated in FIG. 5.

<<Step S14-1>>

In step S14-1, the reaction force actuator control unit detects and stores the stop rotational angle (θSL) of the reaction force electric motor 18. This detected rotational angle corresponds to the stop position serving as the reference position of the steering wheel 12. After the stop rotational angle (θSL) is stored, the processing proceeds to step S14-2.

<<Step S14-2>>

In step S14-2, the reaction force actuator control unit detects the present rotational angle (θact) of the reaction force electric motor 18. This detected rotational angle (θact) corresponds to the displacement rotational angle (θact) of the steering wheel 12 rotated by being grabbed by the driver. Therefore, as the steering wheel 12 is more largely rotated by being grabbed by the driver, the value of the displacement rotational angle (θact) increases. After the displacement rotational angle (θact) is detected, the processing proceeds to step S14-3.

<<Step S14-3>>

In step S14-3, the reaction force actuator control unit determines how much the steering wheel is rotated based on the stop rotational angle (θSL) determined in step S14-1 and the displacement rotational angle (θact) detected in step S14-2. In other words, the reaction force actuator control unit calculates "Δθ=θSL–θact", thereby determining the rotational angle deviation (Δθ) of the steering wheel. This rotational angle deviation (Δθ) serves as the deviation used in the position feedback control. After the rotational angle deviation ($\Delta\theta$) is determined, the processing proceeds to step S23.

<<Step S23>>

In step S23, the reaction force actuator control unit determines whether the rotational angle deviation ($\Delta\theta$) determined in step S14-3 is equal to or smaller than a predetermined deviation threshold value ($\Delta\theta SL$). In other words, if the present rotational angle deviation ($\Delta\theta$) exceeds the deviation threshold value ($\Delta\theta SL$) although the reaction force electric motor 18 has provided the stop torque for stopping the steering wheel 12 according to the execution of the previous processing flow, this means that the steering wheel 12 is largely rotated.

Then, when the grip force of gripping the steering wheel 12 diminishes, the steering wheel 12 is expected to return to the stop position through a rapid rotation. This leads to a necessity for a precaution against that. The deviation threshold value ($\Delta\theta SL$) set in FIG. 6 and the deviation threshold value ($\Delta\theta SL$) set in FIG. 9 may be either equal values or different values.

Then, if the present rotational angle deviation ($\Delta\theta$) is determined to be equal to or smaller than the deviation threshold value ($\Delta\theta SL$), the processing proceeds to step S14-4. If the present rotational angle deviation ($\Delta\theta$) exceeds the deviation threshold value ($\Delta\theta SL$), the processing proceeds to step S24.

<<Step S14-4>>

In step S14-4, based on the rotational angle deviation ($\Delta\theta$) determined in step S14-3, the reaction force actuator control unit calculates the control amount (Tmt) for canceling out this rotational angle deviation ($\Delta\theta$) by the proportional-integral control that is position feedback control, and drives the reaction force electric motor 18. Then, the stop torque is generated on the reaction force electric motor 18 according to the control amount (Tmt), and the rotation of the steering wheel is suppressed. This "position control function" is continuously exerted, and then the processing proceeds to step S15.

<<Step S24>>

The present rotational angle deviation ($\Delta\theta$) is determined to exceed the deviation threshold value ($\Delta\theta SL$) in the determination in step S23. Therefore, in step S24, the reaction force actuator control unit calculates the control amount (Tmt) for suppressing the rapid return of the steering wheel 12 to the stop position based on damping control, and provides it to the reaction force electric motor 18. This causes the steering wheel 12 to return to the stop position in a braked state.

In this manner, when the driver's grip force diminishes or disappears after the steering wheel 12 is largely rotated by being gripped by the driver, the rapid return of the steering wheel 12 to the stop position is suppressed, and the safety can be improved.

This is the processing when the driver gets out of the vehicle. Next, a processing flow when the driver gets into the vehicle will be described. However, the processing is basically similar even in this case.

In the case of the following control, the reaction force actuator controller unit is characterized by being configured to output the stop position maintaining signal to the reaction force actuator when detecting embarkation information indicating that the driver gets into the vehicle with the starter switch of the vehicle in the "OFF" state.

Figure 10:
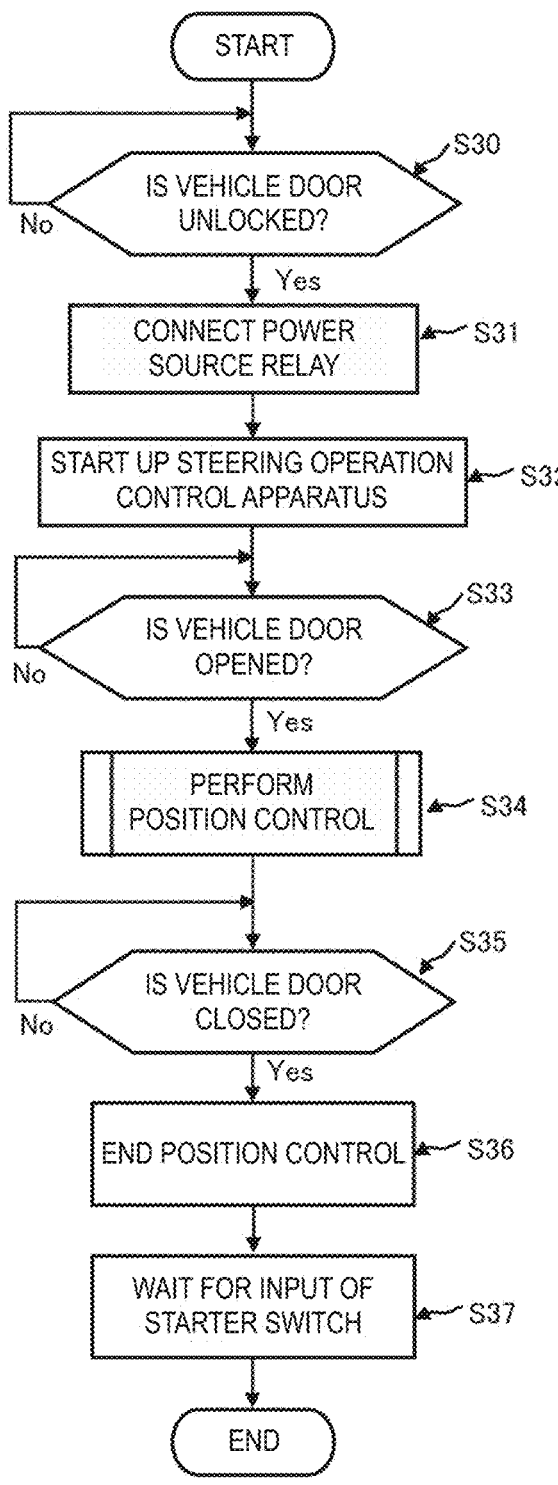
FIG. 10 is a flowchart illustrating a processing flow of the reaction force electric motor when the driver gets into the vehicle according to the embodiment of the present invention.

FIG. 10 illustrates a processing flow when the driver gets into the vehicle using a wireless smart key or the like, but can also be applied to when a normal vehicle key is used.

Further, because this is an example when the driver gets into the stopped vehicle, the starter switch is assumed to be in the "OFF" state.

<<Step S30>>

In step S30, it is determined whether the driver unlocks the vehicle door on the driver's side by, for example, approaching the vehicle or contacting a doorknob of the vehicle door. This determination is made by the vehicle door control apparatus 19A. Then, if the driver is determined to unlock the vehicle door on the driver's side in this control step, the processing proceeds to step S31. On the other hand, if the driver is determined not to unlock the vehicle door on the driver's side, the processing returns to step S30 again. The unlock information at this time is also transmitted to the steering operation control apparatus 19 via the CAN bus 29.

<<Step S31>>

In step S31, the power source relay is connected between the steering operation control apparatus 19 and the power source based on the unlock information of the vehicle door on the driver's side in step S30. This allows the reaction force electric motor 18 and the like to be driven. After the connection of the power source relay is completed, the processing proceeds to step S32.

<<Step S32>>

In step S32, the steering operation control apparatus 19 is started up so as to allow the steering operation control apparatus 19 to operate. This startup completes preparation for exerting the "position control function", which will be described below. After the steering operation control apparatus 19 is started up, the processing proceeds to step S33.

<<Step S33>>

In step S33, whether the vehicle door on the driver's side is opened is determined. If the vehicle door is opened, the driver is estimated to have an intention of getting into the vehicle, and is expected to climb into the vehicle while grabbing the steering wheel 12 when getting into the vehicle.

Now, the fact that the vehicle door is opened is used as information for detecting that the driver gets into the vehicle (the embarkation information). Various kinds of information can be used as the embarkation information besides that, and, for example, the embarkation information can be acquired based on the driver's behavior using the in-vehicle camera. Further alternatively, the embarkation information can be acquired based on the information indicating whether the driver holds the steering wheel 12 using the electrostatic sensor mounted on the steering wheel 12. These kinds of embarkation information can be either used alone or used in combination.

As described above, the steering wheel can be freely rotated when the driver gets into the vehicle because the steering wheel is disconnected from the steering mechanism. This poses such a risk that the driver grabbing the steering wheel may, for example, lose the embarkation posture due to an unintended rotation of the steering wheel, thereby impairing the stability of the embarkation action or incurring injury depending on circumstances. The following step, step S34 is performed as a precaution against such a possibility.

<<Step S34>>

When the vehicle door on the driver's side is opened, in step S34, the reaction force actuator control unit starts up the "position control function" and controls the position of the steering wheel 12. In step S34, the reaction force actuator control unit exerts the "position control function", assuming that the driver gets into the vehicle while grabbing the steering wheel because the vehicle door on the driver's side is opened. This "position control function" is performed in a similar manner to the above-described step, step S14, and the following description will be supplementarily added with reference to FIG. 5.

<<Step S14-1>>

In step S14-1, the reaction force actuator control unit detects and stores the stop rotational angle (θSL) of the reaction force electric motor 18. This detected rotational angle corresponds to the stop position serving as the reference position of the steering wheel 12. After the stop rotational angle (θSL) is stored, the processing proceeds to step S14-2.

<<Step S14-2>>

In step S14-2, the reaction force actuator control unit detects the present rotational angle (θact) of the reaction force electric motor 18. This detected rotational angle (θact) corresponds to the displacement rotational angle (θact) of the steering wheel 12 rotated by being grabbed by the driver. Therefore, as the steering wheel 12 is more largely rotated by being grabbed by the driver, the value of the displacement rotational angle (θact) increases. After the displacement rotational angle (θact) is detected, the processing proceeds to step S14-3.

<<Step S14-3>>

In step S14-3, the reaction force actuator control unit determines how much the steering wheel is rotated based on the stop rotational angle (θSL) determined in step S14-1 and the displacement rotational angle (θact) detected in step S14-2. In other words, the reaction force actuator control unit calculates "$\Delta\theta=\theta SL-\theta act$", thereby determining the rotational angle deviation (Δθ) of the steering wheel. This rotational angle deviation (Δθ) serves as the deviation used in the position feedback control. After the rotational angle deviation (Δθ) is determined, the processing proceeds to step S14-4.

<<Step S14-4>>

In step S14-4, based on the rotational angle deviation (Δθ) determined in step S14-3, the reaction force actuator control unit calculates the control amount (Tmt) for canceling out this rotational angle deviation (Δθ) by the proportional-integral control that is position feedback control, and drives the reaction force electric motor 18. Then, the stop torque is generated on the reaction force electric motor 18 according to the control amount (Tmt), and the rotation of the steering wheel is suppressed. This "position control function" is continuously exerted, and then the processing proceeds to step S35.

The control amount fed to the reaction force electric motor 18 can also be adjusted based on the strength of a grab force applied to the steering wheel 12 (a torque with which the steering wheel is rotated by the driver).

<<Step S35>>

Referring back to FIG. 10, in step S35, the reaction force actuator control unit determines whether the vehicle door on the driver's side is closed. If the vehicle door on the driver's side is closed, the driver is estimated to already get in the vehicle and release his/her hand from the steering wheel or just put his/her hand on the steering wheel. Therefore, in this case. the processing proceeds to step S36.

On the other hand, if the vehicle door on the driver's side is not closed, the driver is estimated to still grip the steering wheel. Therefore, the processing continuously returns to step S35 again.

Now, the information indicating that the vehicle door on the driver's side is closed is used as information for detecting that the driver has gotten into the vehicle (embarkation completion information). Various kinds of information can be used as the embarkation completion information besides that, and, for example, the embarkation completion information can be acquired based on the driver's behavior using the in-vehicle camera. Further alternatively, the embarkation completion information can be acquired based on the information indicating whether the driver holds the steering wheel 12 using the electrostatic sensor mounted on the steering wheel 12. These kinds of embarkation completion information can be either used alone or used in combination.

<<Step S36>>

Since the vehicle door on the driver's side is determined to be closed in step S35, in step S36, the execution of the "position control function" is ended. In this case, the execution of the "position control function" can be ended by, for example, stopping driving the reaction force electric motor 18. After this step is completed, the processing proceeds to step S17.

<<Step S37>>

In step S37, the reaction force actuator control unit waits for an input of the starter switch by the driver after the above-described processing flow is ended. An input of the starter switch leads to a start of the processing flow illustrated in FIG. 4. When the starter switch is input, for example, start control by a starter motor is triggered in an internal combustion engine.

In the above-described manner, one aspect of the present invention is a steering operation control apparatus usable for a steer-by-wire steering apparatus in which a steering wheel and a steering mechanism configured to drive a steering target wheel are disconnected without being coupled mechanically. The steering operation control apparatus includes a steering control portion configured to control a steering actuator configured to operate the steering mechanism, and a reaction force control portion coupled with the steering wheel and configured to control a reaction force actuator configured to provide a reaction force to the steering wheel. The reaction force control portion has a function of outputting a stop position maintaining signal required for the reaction force actuator to maintain a present position of the steering wheel to the reaction force actuator when a driver is detected to get out of or get into a vehicle.

According thereto, the one aspect of the present invention can avoid such a risk that the driver grabbing the steering wheel when getting out of or getting into the vehicle may lose his/her disembarkation posture or embarkation posture due to an unintended rotation of the steering wheel to impair the stability of the disembarkation action or the embarkation action or incur injury depending on circumstances. Further, this aspect just feeds the stop position maintaining signal for maintaining the present position of the steering wheel to the reaction force actuator, thereby being able to suppress an unintended rotation of the steering wheel with a simple configuration.

The present invention is not limited to the above-described several embodiments, and includes various modifications. The above-described embodiments have been described in detail to facilitate a better understanding of the present invention, and the present invention is not necessarily limited to the configuration including all of the described features. Further, a part of the configuration of some embodiment can be replaced with the configuration of another embodiment, and some embodiment can also be implemented with a configuration of another embodiment added to the configuration of this embodiment. Each embodiment can also be implemented with another configuration added, deleted, or replaced with respect to the configuration of this embodiment.

The present application claims priority under the Paris Convention to Japanese Patent Application No. 2022-031522 filed on Mar. 2, 2022. The entire disclosure of Japanese Patent Application No. 2022-031522 filed on Mar. 2, 2022 including the specification, the claims, the drawings, and the abstract is incorporated herein by reference in its entirety.

REFERENCE SIGNS LIST 10 steering target wheel
12 steering wheel
13 steering shaft
14 rotational angle sensor
14A steering operation angle sensor
16 steering mechanism
17 steering rod
18 reaction force electric motor
19 steering operation control apparatus
19A vehicle door control apparatus
19N seat belt control apparatus
28 steering electric motor
29 CAN bus
30 controller
31 rotational position comparison block
32 PWM control block

The invention claimed is:

1. A steering operation control apparatus usable for a steer-by-wire steering apparatus in which a steering wheel and a steering mechanism configured to drive a steering target wheel are disconnected without being coupled mechanically, the steering operation control apparatus comprising:

a steering control unit configured to control a steering electric motor, the steering electric motor being configured to operate the steering mechanism; and a reaction force control unit coupled with the steering wheel and configured to control a reaction force electric motor, the reaction force electric motor being configured to provide a reaction force to the steering wheel, wherein:

the reaction force control unit is configured to be kept powered on until a driver completes disembarkation or embarkation in a state that a starter switch of a vehicle is in an OFF state;

the reaction force control unit has a position control function of, in a case where the steering wheel is detected to be in a state rotated from a stop position due to such an action that the driver gets out of or gets into the vehicle while gripping the steering wheel until the driver completes the disembarkation or the embarkation: (i) detecting a rotational position of the steering wheel in the state that the steering wheel is rotated from the stop position; and (ii) outputting a stop position maintaining signal required for the reaction force electric motor to cancel out a rotational angle deviation between the rotational position of the steering wheel and the stop position of the steering wheel to the reaction force electric motor to cause the reaction force electric motor to generate a stop torque for suppressing a rotation of the steering wheel every time a predetermined preset time has elapsed; and the position control function is configured to adjust a control amount of the stop position maintaining signal to provide to the reaction force electric motor based on a strength of a rotational torque applied to the steering wheel by the driver.

2. The steering operation control apparatus according to claim 1, wherein the reaction force control unit is configured to output the stop position maintaining signal to the reaction force electric motor when the starter switch of the vehicle is in the OFF state and disembarkation information is detected, the disembarkation information indicating that the driver gets out of the vehicle.

3. The steering operation control apparatus according to claim 1, wherein the reaction force control unit is configured to output the stop position maintaining signal to the reaction force electric motor when the starter switch of the vehicle is in an ON state and vehicle stop information and disembarkation information are detected, the vehicle stop information indicating that the vehicle is temporarily stopped to allow the driver to get out of the vehicle, and the disembarkation information indicating that the driver gets out of the vehicle.

4. The steering operation control apparatus according to claim 1, wherein the reaction force control unit is configured to output the stop position maintaining signal to the reaction force electric motor when the starter switch of the vehicle is in the OFF state and embarkation information is detected, the embarkation information indicating that the driver gets into the vehicle.

5. The steering operation control apparatus according to claim 2, wherein the reaction force control unit is configured to acquire the disembarkation information based on an open state of a vehicle door on a driver's side of the vehicle.

6. A steering operation control apparatus usable for a steer-by-wire steering apparatus in which a steering wheel and a steering mechanism configured to drive a steering target wheel are disconnected without being coupled mechanically, the steering operation control apparatus comprising:

a steering control unit configured to control a steering electric motor, the steering electric motor being configured to operate the steering mechanism; and a reaction force control unit coupled with the steering wheel and configured to control a reaction force electric motor, the reaction force electric motor being configured to provide a reaction force to the steering wheel, wherein:

the reaction force control unit is configured to be kept powered on until a driver completes disembarkation or embarkation in a state that a starter switch of a vehicle is in an OFF state;

the reaction force control unit has a position control function of, in a case where the steering wheel is detected to be in a state rotated from a stop position due to such an action that the driver gets out of or gets into the vehicle while gripping the steering wheel until the driver completes the disembarkation or the embarkation: (i) detecting a rotational position of the steering wheel in the state that the steering wheel is rotated from the stop position; and (ii) outputting a stop position maintaining signal required for the reaction force electric motor to cancel out a rotational angle deviation between the rotational position of the steering wheel and the stop position of the steering wheel to the reaction force electric motor to cause the reaction force electric motor to generate a stop torque for suppressing a rotation of the steering wheel every time a predetermined preset time has elapsed;

the position control function is configured to adjust a control amount of the stop position maintaining signal to provide to the reaction force electric motor based on a strength of a rotational torque applied to the steering wheel by the driver; and the reaction force control unit is further configured to forcibly stop the rotation of the steering wheel by driving a mechanical steering lock mechanism upon a determination that the stop torque of the reaction force electric motor cannot block the rotation of the steering wheel caused by an external force applied by the driver in a state that the reaction force electric motor applies the stop torque for suppressing a rotation of the steering wheel.

7. A steer-by-wire steering system in which a steering wheel and a steering mechanism configured to drive a steering target wheel are disconnected without being coupled mechanically, the steering system comprising:

a steering electric motor configured to operate the steering mechanism;

a steering control unit configured to control the steering electric motor;

a reaction force electric motor coupled with the steering wheel and configured to provide a reaction force to the steering wheel; and a reaction force control unit configured to control the reaction force electric motor, wherein:

the reaction force control unit is configured to be kept powered on until a driver completes disembarkation or embarkation in a state that a starter switch of a vehicle is in an OFF state;

the reaction force control unit has a position control function of, in a case where the steering wheel is detected to be in a state rotated from a stop position due to such an action that the driver gets out of or gets into the vehicle while gripping the steering wheel until the driver completes the disembarkation or the embarkation: (i) detecting a rotational position of the steering wheel in the state that the steering wheel is rotated from the stop position; and (ii) outputting a stop position maintaining signal required for the reaction force electric motor to cancel out a rotational angle deviation between the rotational position of the steering wheel and the stop position of the steering wheel to the reaction force electric motor to cause the reaction force electric motor to generate a stop torque for suppressing a rotation of the steering wheel every time a predetermined preset time has elapsed; and the position control function is configured to adjust a control amount of the stop position maintaining signal to provide to the reaction force electric motor based on a strength of a rotational torque applied to the steering wheel by the driver.

8. The steering operation control apparatus according to claim 4, wherein the reaction force control unit is configured to acquire the embarkation information based on an open state of a vehicle door on a driver's side of the vehicle.

9. The steering operation control apparatus according to claim 2, wherein the reaction force control unit is configured to acquire the disembarkation information from a signal of an electrostatic sensor mounted on the steering wheel.

10. The steering operation control apparatus according to claim 4, wherein the reaction force control unit is configured to acquire the embarkation information from a signal of an electrostatic sensor mounted on the steering wheel.

11. The steering operation control apparatus according to claim 1, wherein the position control function is configured to determine the control amount of the stop position maintaining signal based on position feedback control so as to cancel out the rotational angle deviation.

12. A steering operation control method performed by a steering operation control apparatus, the steering operation control apparatus being usable for a steer-by-wire steering apparatus in which a steering wheel and a steering mechanism configured to drive a steering target wheel are disconnected without being coupled mechanically, the steering operation control apparatus including a steering control unit configured to control a steering electric motor configured to operate the steering mechanism, and a reaction force control unit coupled with the steering wheel and configured to control a reaction force electric motor configured to provide a reaction force to the steering wheel, the reaction force control unit being configured to be kept powered on until a driver completes disembarkation or embarkation in a state that a starter switch of a vehicle is in an OFF state, and the steering operation control method comprising:

causing the reaction force control unit to perform, in a case where the steering wheel is detected to be in a state rotated from a stop position due to such an action that the driver gets out of or gets into the vehicle while gripping the steering wheel until the driver completes the disembarkation or the embarkation: (i) detecting a rotational position of the steering wheel in the state that the steering wheel is rotated from the stop position; and (ii) outputting a stop position maintaining signal required for the reaction force electric motor to cancel out a rotational angle deviation between the rotational position of the steering wheel and the stop position of the steering wheel to the reaction force electric motor to cause the reaction force electric motor to generate a stop torque for suppressing a rotation of the steering wheel every time a predetermined preset time has elapsed; and (iii) adjusting a control amount of the stop position maintaining signal to provide to the reaction force electric motor based on a strength of a rotational torque applied to the steering wheel by the driver.

* * * * *